United States Patent [19]

Toyoda et al.

[11] 4,385,819

[45] May 31, 1983

[54] DISPLAY DEVICE IN AUTOMATIC EXPOSURE CONTROL CAMERA

[75] Inventors: Kenji Toyoda, Kawasaki; Yoshitaka Araki, Tokyo; Sakuji Watanabe, Warabi, all of Japan

[73] Assignee: Nippon Kogaku K.K., Tokyo, Japan

[21] Appl. No.: 335,470

[22] Filed: Dec. 29, 1981

Related U.S. Application Data

[63] Continuation of Ser. No. 144,966, Apr. 29, 1980, abandoned, which is a continuation of Ser. No. 966,127, Dec. 4, 1978, Pat. No. 4,204,755.

[30] Foreign Application Priority Data

Dec. 3, 1977 [JP] Japan ................. 52-145513

[51] Int. Cl.³ .................... G03B 7/087; G03B 17/18
[52] U.S. Cl. ........................ 354/36; 354/42; 354/60 E
[58] Field of Search ............. 354/36, 37, 38, 39, 354/40, 41, 42, 43, 44, 45, 46, 47, 53, 57, 60 E, 60 L, 289

[56] References Cited

U.S. PATENT DOCUMENTS 4,104,655 8/1978 Strauss .................. 354/60 L X
4,146,318 3/1979 Rochat .................. 354/43

*Primary Examiner*—Michael L. Gellner
*Attorney, Agent, or Firm*—Fitzpatrick, Cella, Harper & Scinto

[57] ABSTRACT

An automatic exposure control camera adjusts automatically the lens aperture in accordance with information on shutter speed determined in accordance with the brightness of an object or shutter speed set in accordance with manual setting from outside and information on the brightness of the object. The camera controls automatically the shutter speed in accordance with the information on the adjusted aperture value and the information on the brightness of the object. The camera can display a shutter speed value to which a preset shutter speed is automatically corrected when a proper exposure is not obtained even if the aperture is a fully open aperture.

10 Claims, 9 Drawing Figures

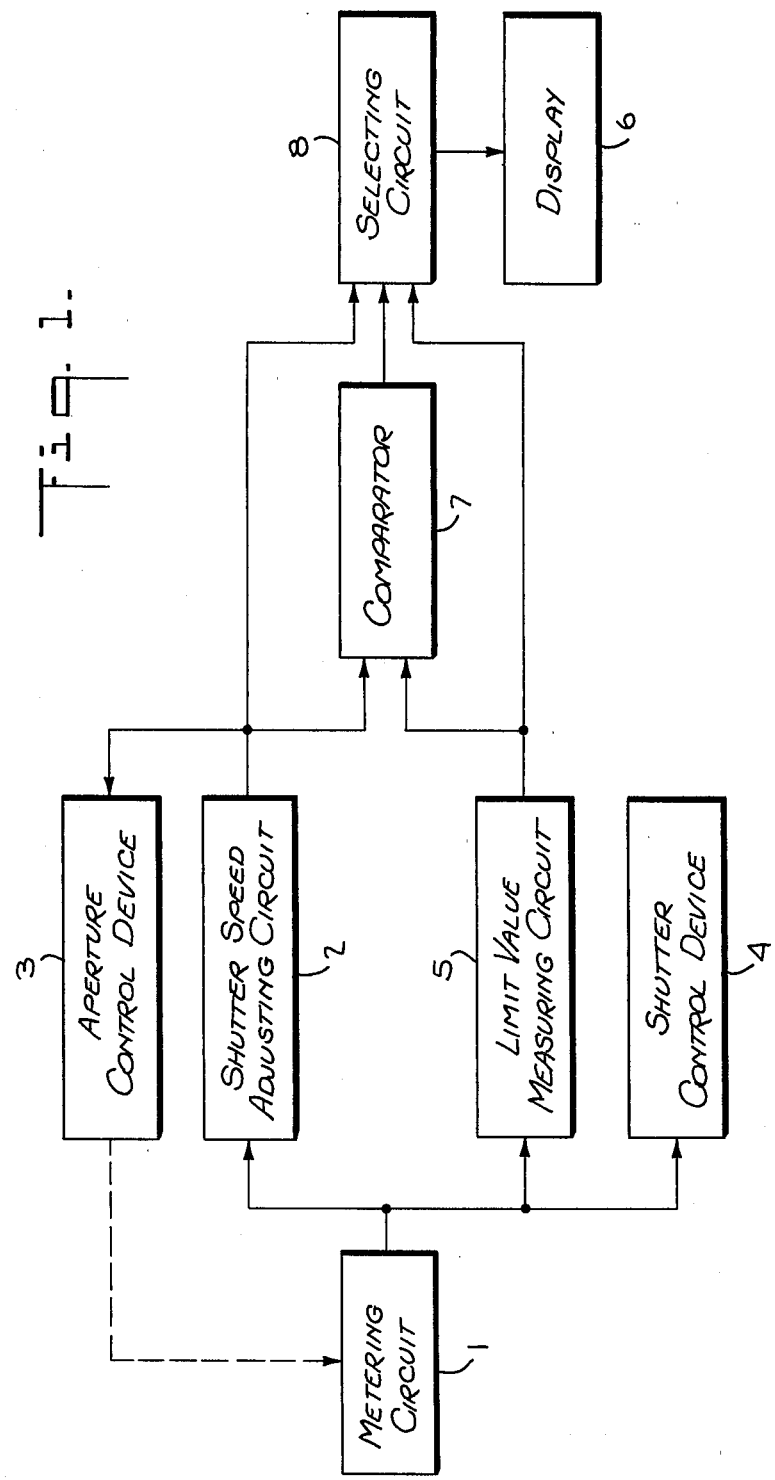

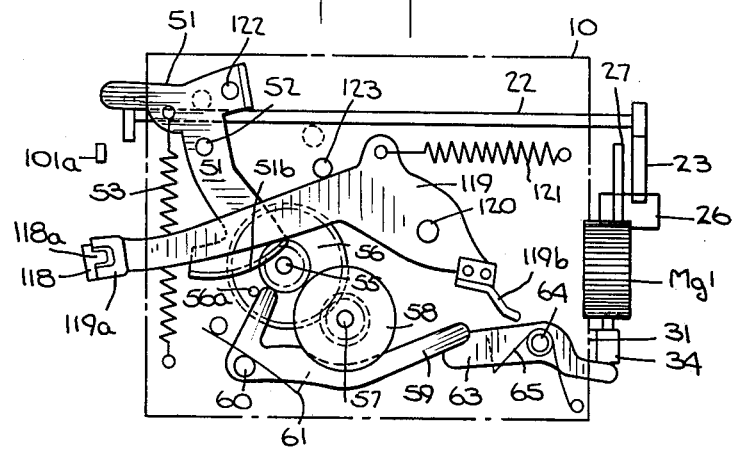
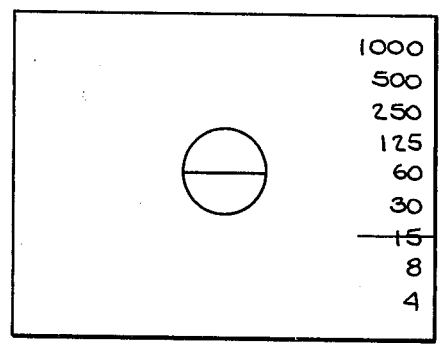
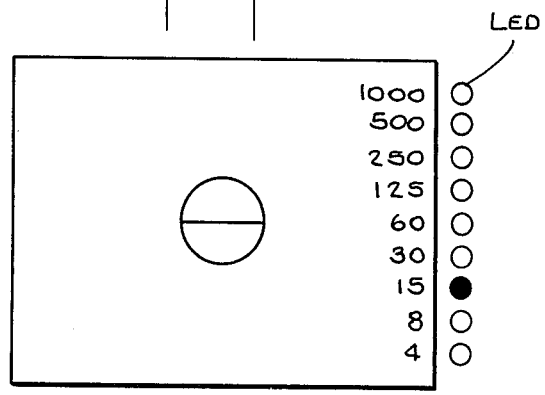

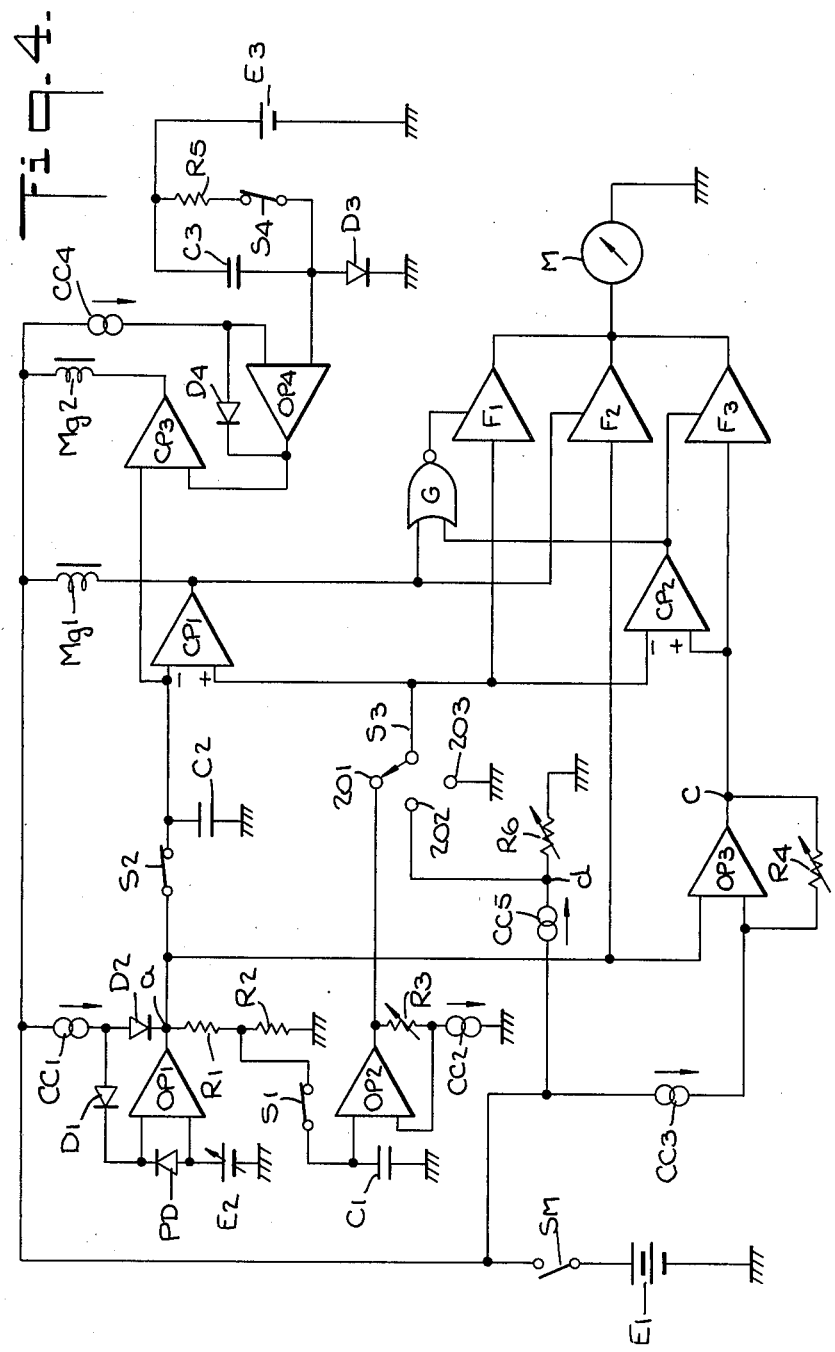

DISPLAY DEVICE IN AUTOMATIC EXPOSURE CONTROL CAMERA

This is a continuation of application Ser. No. 144,966, filed Apr. 29, 1980, now abandoned, which is a continuation of U.S. Pat. No. 4,204,755, Ser. No. 966,127, filed Dec. 4, 1978.

BACKGROUND OF THE INVENTION

1. Field of the Invention

This invention relates to a display device in an automatic exposure control camera.

2. Description of the Prior Art

There has heretofore been proposed an automatic exposure camera designed to automatically adjust the lens aperture in accordance with the information on a shutter speed determined in accordance with the information on the brightness of an object or a shutter speed set in accordance with manual setting from outside and the information on the brightness of the object and to automatically control the shutter speed in accordance with the information on the adjusted aperture value and the information on the brightness of the object. Such an automatic exposure camera is highly effective in that when a proper exposure is not obtained even if the aperture is a fully open aperture diameter or a minimum aperture diameter, a preset shutter speed is automatically corrected to a value suited for proper exposure, but it has been difficult with such camera to display the value of the corrected shutter speed. The present invention overcomes this problem.

SUMMARY OF THE INVENTION

According to the present invention, there is provided an automatic exposure control camera having a circuit for generating a first signal corresponding to a shutter speed determined in accordance with the information on the brightness of an object or determined by manual setting operation, means for setting an aperture diameter in accordance with the first signal and the information on the brightness of the object, an aperture control device for controlling the aperture mechanism of an objective lens mounted on the camera in accordance with the set aperture diameter, and a shutter control device for controlling the shutter speed in accordance with the information on the aperture controlled by the aperture control device and the information on the brightness of the object, the camera further comprising means for displaying the shutter speed, a circuit for generating a second signal corresponding to the shutter speed determined in accordance with a controllable limit value of the aperture diameter and the information on the brightness of the object, and selecting means for selecting the first signal when the determined aperture diameter is within the controllable limit value and selecting the second signal when the determined aperture diameter exceeds the controllable limit value and for applying the selected signal to the display means.

The invention will become more fully apparent from the following detailed description thereof taken in conjunction with the accompanying drawings.

BRIEF DESCRIPTION OF THE DRAWINGS

FIG. 1 is a block diagram showing the basic construction of the display device in the automatic exposure control camera according to the present invention.

FIGS. 2A, 2B and 2C show the mechanism of a portion of the aperture control device 3 and the shutter control device 4 in FIG. 1 and are views as seen from the left side, the right and the bottom side, respectively, of the camera.

FIG. 4 is a circuit diagram specifically showing the circuit arrangement in place of the block diagram of FIG. 1.

FIGS. 5A and 5B show the display forms of the indicator indicating the shutter speeds.

DESCRIPTION OF THE PREFERRED EMBODIMENTS

Figure 2A:
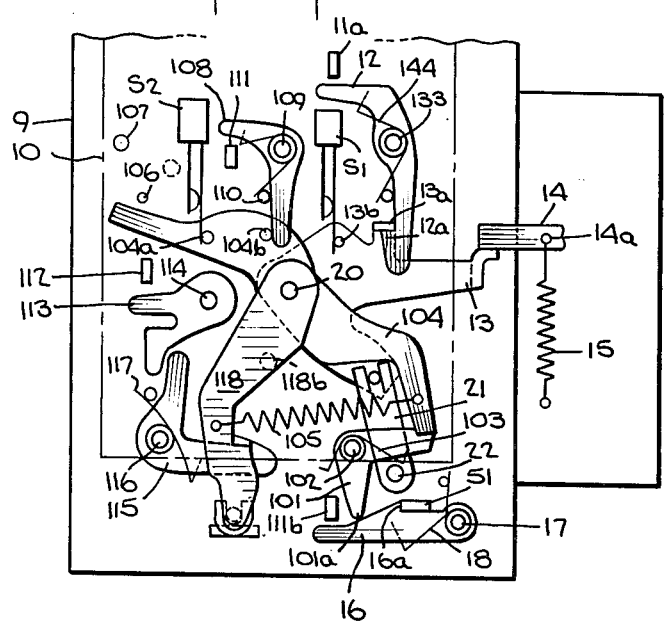

Referring to FIG. 1, it is a block diagram showing the basic construction of the present invention. Designated by 1 is a metering circuit for receiving light from an object passed through an objective lens and producing a metering output corresponding to the brightness of the object. Denoted by 2 is a first circuit for producing a first signal corresponding to a shutter speed determined in accordance with the metering output from the metering circuit or a shutter speed determined in accordance with manual setting from outside. Numeral 3 designates an aperture control device for setting the aperture diameter in accordance with the first signal from the first circuit 2 and automatically adjusting the aperture of the objective lens in accordance with the set aperture diameter. Numeral 4 denotes a shutter control device for automatically controlling the set shutter speed in accordance with the information on the aperture after adjustment by the aperture control device 3 and the information on the brightness of the object. The two information signals applied to the shutter control device 4 may be taken out from the metering output of the metering circuit 1. Designated by 5 is a second circuit for producing a second signal corresponding to a shutter speed determined in accordance with a controllable limit aperture diameter and the information on the brightness of the object. Denoted by 6 is a display device for displaying the controlled shutter speed and capable of effecting analog display by a meter or the like or digital display by a light-emitting element or the like. Numeral 7 denotes a comparator circuit provided to compare the first signal with the second signal. Designated by 8 is a selecting circuit for selectively applying the first signal or the second signal to the display device in accordance with the output of the comparator circuit.

In the initial stage of operation, the metering circuit 1 effects metering under a maximum aperture and the metering output thereof is applied to the first circuit 2. The first circuit 2 produces a first signal corresponding to the shutter speed determined in accordance with the metering output or the shutter speed determined in accordance with manual setting from outside and applies the first signal as one input to the comparator circuit 7. On the other hand, the second circuit 5 produces a second signal corresponding to the shutter speed determined in accordance with a controllable limit aperture diameter and the information on the brightness of the object and applies the second signal as the other input to the comparator circuit.

In the next stage by the depression of a shutter button, the aperture control device 3 sets the aperture diameter in accordance with the first signal and automatically adjusts the aperture of the objective lens in accordance with the set aperture diameter. If there is then no aperture value to be adjusted due to the object being too bright or too dark, the aperture control device 3 adjusts the aperture to a maximum aperture diameter or a minimum aperture diameter or a preset aperture diameter preset by an aperture ring. When this stage comes to an end, the shutter control device 4 automatically controls the shutter speed in accordance with the aperture value after adjustment. The shutter speed controlled at this time comes to correspond to the second signal and naturally differs from the shutter speed corresponding to the first signal.

Thereupon, the comparator circuit 7 receives the first and second signals as input and compares these two signals and, when the shutter speed controlled by the shutter control device 4 corresponds to the first signal, it applies the first signal to the display device 6 through the selecting circuit 8 and when said shutter speed does not correspond to the first signal, it applies the second signal to the display device 6 through the selecting circuit 8.

Thus, the display device always displays the actually controlled shutter speed.

According to the above-described embodiment of the present invention, the first signal produced by the first circuit 2 includes a program signal corresponding to the shutter speed pre-programmed in accordance with the brightness of the object or a manual signal corresponding to the shutter speed manually set from outside. Also, the second signal produced by the second circuit 5 includes a first correction signal corresponding to the shutter speed determined by the brightness of the object when the aperture is its maximum or fully open aperture diameter and a second correction signal corresponding to the shutter speed determined by the brightness of the object when the aperture is its minimum aperture diameter or a preset aperture diameter.

Figure 2B:
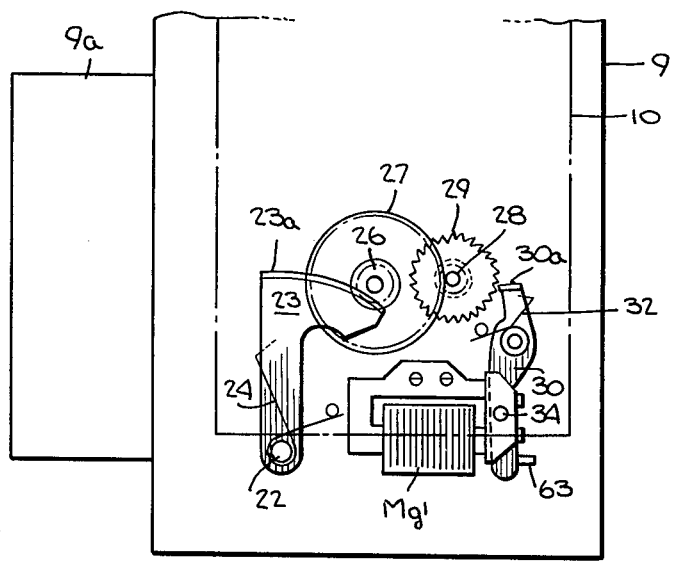

Embodiments of the present invention will now be described. The mechanism portion will first be considered. In FIG. 2A, a camera body 9 has a lens 9a and numeral 10 designates a mirror box. When a shutter button (not shown) is depressed, an upper level 11a and a lower level 11b are depressed downwardly in response thereto, so that a restraining pawl 12 is rotated counter-clockwise about a rotary shaft 133 against the force of a spring 144 while a restraining pawl 16 is rotated counter-clockwise about a rotary shaft 17 against the force of a spring 18. Thereupon, the engagement between the pawled portion 12a of the restraining pawl 12 and the pawled portion 13a of an aperture actuating lever 13 is broken. The aperture actuating lever 13 begins to rotate clockwise about a rotary shaft 20 integrally with a stop-down lever 14 by the spring force of a spring 15 secured to the stop-down lever 14 for actuating an unshown aperture blade provided to the lens 9a. In the initial stage of the rotation, the lever 13 opens a switch S1. As the lever 13 is rotated, an intermediate lever 21 is rotated counter-clockwise by the engagement of a pin 13c. That rotation is transmitted to a sector lever 23 through an intermediate shaft 22 (FIG. 2B). The sector level 23 has a gear 23a whose rotation is increased in speed by gears 26, 27 and 28 and transmitted to a ratchet gear 29. On the other hand, when the restraining pawl 16 is rotated by depression of the shutter button, as already described, the engagement between the restraining portion 16a of the pawl 16 and a lever 51 is broken to permit the lever 51 to be rotated counter-clockwise about a shaft 52 by the force of a spring 53 (FIG. 2C). The lever 51 has a ger 51b which is in mesh-engagement with a gear 55. Gears 55, 56 and 57 and fly-wheel 58 together constitute a delay mechanism which serves to delay the operation of the lever 51. In the initial stage of operation of the lever 51, a pin 56a studded in the gear 56 is clockwisely retracted, so that a lever 59 is rotated counter-clockwisely about a shaft 60 by the force of a spring 61. Thereupon, a hold lever 63 is rotated about a shaft 64 by the force of a spring 65 to release a lever 30 which has so far been forced against an electromagnet Mg1 (FIG. 2B). However, as will hereinafter be described, in the initial stage of depression of the shutter button, a main switch SM is closed and the electromagnet Mg1 is energized, so that an iron piece 34 is attracted to the electromagnet Mg1 and the lever 30 remains stationary.

When the stop-down lever 14 adjacent to the lens is downwardly moved by the force of the spring 15, the aperture of the lens is stopped down from fully open aperture to a small aperture by a known mechanism and at a point of time whereat the value of the aperture has become suitable, the electromagnet Mg1 is deenergized by the operation of a circuit which will later be described, and the iron piece 34 is separated from the electromagnet Mg1, with a result that the lever 30 is rotated counter-clockwisely by the action of a spring 32 and the pawl 30a of the lever 30 comes into engagement with a ratchet wheel 29 to restrain the latter. In FIGS. 2A and 2C, as the lever 51 is rotated further counter-clockwisely, it comes to bear against a portion 101a of a lever 101 in the vicinity of the end of its movement, so that the lever 101 is rotated clockwisely about a shaft 102 against the force of a spring 103 and becomes disengaged from a lever 104. Thereupon, the lever 104 is rotated clockwisely by the action of a spring 105, and in the initial stage of that rotation, a pin 104a opens a switch S2. As the lever 104 is further rotated, it raises a pin 106 secured to an unshown mirror receiver, so that the mirror is pivoted upwardly with 107 as the pivot axis. In accordance with the rotation of the lever 104, a lever 108 is rotated counter-clockwisely about a shaft 109 against the force of a spring 110 by a pin 104b and at the end of rotation of the lever 104, it depresses the release lever 111 of the shutter to release the shutter.

When a predetermined exposure time comes to an end and the movement of the rearward curtain of the focal plane shutter is terminated, the signal lever 112 of the shutter is moved downwardly and as a result, a lever 115 is rotated clockwisely about a shaft 116 against the force of a spring 117 through the agency of an intermediate lever 113. Thereupon, the engagement between a lever 115 and a lever 118 is broken so that a lever 119 is rotated clockwisely about a shaft 120 by the force of a spring 121 (FIG. 2C). Since a portion 119a of the lever 119 is in engagement with a pin 118a secured to the lever 118, the lever 118 is rotated counter-clockwisely with the rotation of the lever 119. In the initial stage of rotation of the lever 119, one end 119b of the lever 119 bears against the lever 63 to rotate the latter counter-clockwisely to break the engagement between the pawl 30a of the lever 30 and the ratchet wheel 29. As the levers 118 and 119 are further rotated, a pin 118b secured to the lever 118 bears against the levers 104 and 13 to return these two levers and a series of system 21, 22, 23, 26, 27, 28 and 29 engaged therewith to their shown positions. Thus, the pin 106 is returned by an unshown spring, so that the mirror is lowered and the aperture is returned to its open position by the return of the lever 14.

What has been described above completes a cycle of photography and next, when an unshown film advance lever is operated, a pin 122 is moved clockwisely in response thereto and the lever 51 is returned to its position of FIG. 2C, and subsequently, a pin 123 is moved clockwisely to return the levers 119 and 118 to their shown positions.

Figure 3A:
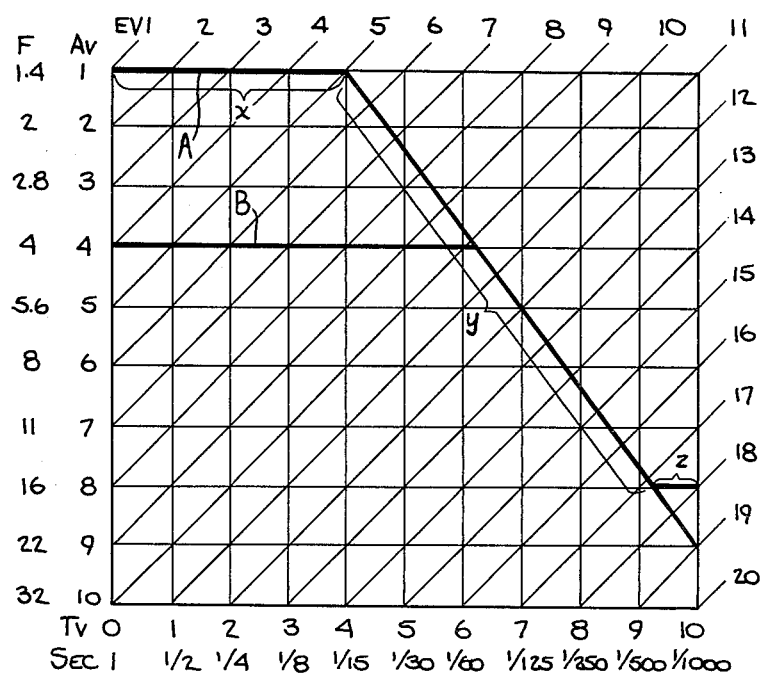
FIGS. 3A and 3B are program diagrams showing the program of the shutter speed and are views as seen from the left side, the right side and the bottom side, respectively, of the camera.
Figure 3B:
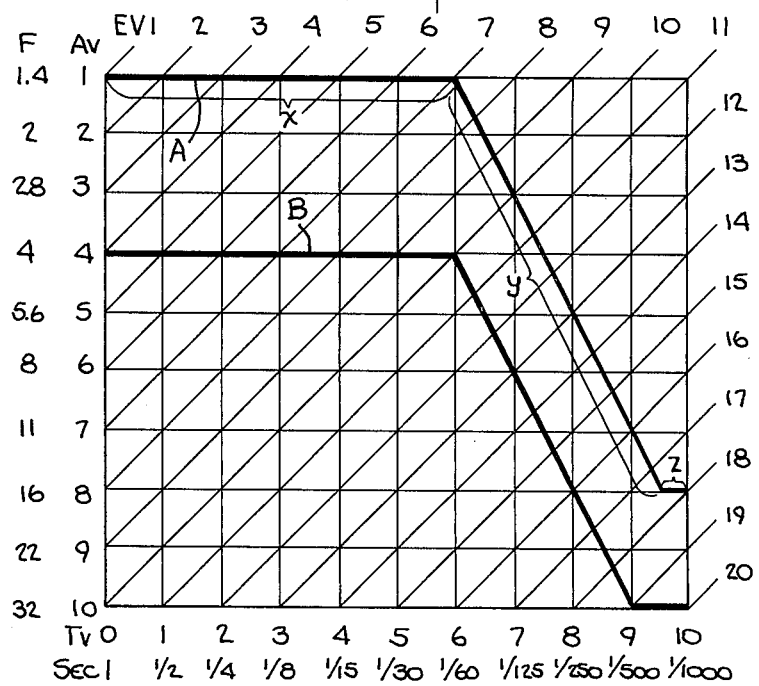

Description will now be made of the program. In an interchangeable lens type camera like a single lens reflex camera, two program systems are conceivable depending on the manner of treating the difference between the open aperture diameter and the minimum aperture diameter of each lens, as shown in FIGS. 3A and 3B. In FIGS. 3A and 3B, there are typically shown a lens of maximum aperture diameter F1.4 and minimum aperture diameter F16 (hereinafter referred to as the lens A) and a lens of maximum aperture diameter F4 and minimum aperture diameter F32 (hereinafter referred to as the lens B). The diagram of this program is divided into three parts, namely, a part in which only the shutter speed is varied with the aperture remaining to be the maximum aperture diameter as EV is increased (hereinafter referred to the part x), a part in which both the aperture value and the shutter speed are varied (hereinafter referred to the part y), and a part in which only the shutter speed is varied with the aperture remaining to be the minimum aperture diameter (hereinafter referred to as the part z).

In the system of FIG. 3A, the part y is common between the lens A and the lens B, but in the system of FIG. 3B, the part y of the lens B is the part y of the lens A parallel moved. The relations of the part y will hereinafter be derived of the respective lenses. In the relations use is made of APEX indication (AV ... Aperture value, Tv ... Time value, Ev, ... Exposure value, Bv ... Luminance value, Sv ... ASA Speed value) for simplicity. From a simple observation, the equation for the part y of FIG. 3A is $$Tv = 0.75 Av + 3.25 \\ = 0.75 (Av - AvO) + 0.75 AvO + 3.25 \quad (1)$$

where AvO: the Av value of the lens maximum aperture diameter. The part y of FIG. 3B is $$Tv = 0.5 (Av - AvO) + 6 \quad (2)$$

From this, the general equation for the part y is $$Tv = \alpha (Av - AvO) + \beta AvO + \gamma \quad (3)$$

where $\alpha$, $\beta$ and $\gamma$ are constants.

In the system of FIG. 3A, $\beta = \alpha$
In the system of FIG. 3b, $\beta = 0$ The variable of the aperture value is (Av−AvO) instead of Av because this is easier to handle in the case of the TTL metering system.

Next, by introducing the equation for proper exposure of APEX indication $$Av + Tv = Bv + Sv$$

equation (3) may be reformed as:

$$Tv = \alpha(Bv + Sv - Tv - AvO) + \beta AvO + \gamma \quad (4)$$

$$Tv = \frac{\alpha}{1+\alpha}(Bv + Sv - AvO) + \frac{1}{1+\alpha}(\beta AvO + \gamma)$$

Equation (4) is an equation for calculating the shutter speed which lies on the straight line of the part y of the program of FIG. 3A or 3B for a given brightness of the object, a given film sensitivity and a given open aperture of the lens and which is suited for the condition of proper exposure.

Description will now be made of the circuit portion and the operation thereof.

In FIG. 4, in the program mode, a switch S3 selects a terminal 201 and the aperture ring of the lens is set to a minimum aperture (F16 in case of the lens A and F32 in case of the lens B). When the shutter button is depressed, the power switch $S_M$ is closed in the first stage of the depression and a current is supplied from a source battery E1 to the entire circuit system. A photodiode PD receives the light passed through the lens and the diaphragm and produces a photocurrent proportional to the intensity of said light. This photocurrent is logarithmically compressed by an amplifier OP1 and a diode D1. A constant current source CC1 and a diode D2 are provided to compensate for the temperature characteristic of a diode D1. In this stage, the levers 12 and 16 described in connection with FIGS. 2A to 2C are not yet moved, so that the aperture lever 14 of the lens is held in its fully open position by the lever 13 and the aperture of the lens is maximum (the condition of FIG. 2A). Therefore, the light impinging on the photodiode PD becomes the object light minus the information on the maximum aperture diameter of the lens, and the logarithmically compressed value thereof equals (Bv−AvO) in APEX indication. Since a voltage corresponding to the film sensitivity information Sv is being applied to the input of the amplifier OP1 by a variable constant voltage circuit E2, the voltage VA at the output terminal a of the amplifier OP1 is:

$$VA = (Bv + Sv - AvO) \quad (5)$$

This voltage at the point a is divided by resistors R1 and R2. Since the resistance ratio of these resistors R1 and R2 is set such that it becomes $(\alpha)/(1+\alpha)$ of equation (4), the voltage at the junction between the resistors R1 and R2 becomes $(\alpha)/(1+\alpha)(Bv+Sv-AvO)$. This voltage is applied to an amplifier OP2 through a switch S1 which corresponds to the switch S1 in FIG. 2A and there, the information $(1)/(1+\alpha)(\beta AvO+\gamma)$ is added to this voltage by a constant current source CC2 and a variable resistor R3, as the result of which the voltage $V_B$ at the output terminal b of the amplifier OP2 becomes $$V_B = \frac{\alpha}{1+\alpha}(Bv + Sv - AvO) + \frac{1}{1+\alpha}(\beta AvO + \gamma) \quad (6)$$

and this corresponds to Tv in equation (4). In case of the program of FIG. 3A, the resistor R3 need be constructed so as to be variable by the maximum aperture diameter of the lens, but in the program of FIG. 3B, $\beta = 0$ and therefore, the resistor R3 may be a fixed resistor corresponding to $\gamma$. On the other hand, the output voltage of the amplifier OP1, namely, the voltage at the point a, is applied to the input terminal of an amplifier OP3. Here, the aperture value set for the aperture ring by a variable resistor R4 variable in response to the constant current source CC3 and the aperture ring of the lens, namely, the information ((Av) preset−AvO) in APEX indication, is subtracted. In this case, the aperture ring is set to the aperture value of the minimum aperture diameter, namely, Av min, and therefore the voltage $V_C$ at the output terminal c of the amplifier OP3 is $$(Bv+Sv-AvO)-(Avmin-AvO)=Bv+Sv-Avmin \qquad (7)$$

If equations (5), (6) and (7) are compared with the equation for proper exposure in APEX indication, $$Av+Tv=Bv+Sv$$

namely, $$Tv=Bv+Sv-Av,$$

then the following will be seen. That is, the voltage $V_A$ at the point a (the first correction signal) represents the Tv value suited for the condition of proper exposure at the maximum aperture diameter, nemaly, (Tv)a which is the Tv value of the part x in the program diagram, the voltage $V_B$ at the point b (program signal) represents (Tv)b which is the Tv value of the part y in the pgrogram diagram, and the voltage $V_C$ at the point c (the second correction signal) represents (Tv)c which which is the Tv value suited for the condition of proper exposure at the minimum aperture diameter, namely, the Tv value of the part z in the program diagram. The voltage $V_A$ is applied to comparators CP1 and CP3 through a voltage follower F2 which is a second analog switch and a switch S2 which corresponds to the switch S2 of FIG. 2A, the voltage $V_B$ is applied to a voltage follower F1 which is a first analog switch and to a comparator CP1, and the voltage $V_C$ is applied to a voltage follower F3 which is a third analog switch and to a comparator CP2. These voltage followers F1, F2 and F3 each have an enabling terminal (control terminal) and such a characteristic that when the enabling terminal is at H (high) level, they produce the input voltage intactly at the output terminal and that when the enabling terminal is at L (low) level, the output voltage becomes inconstant while the output impedance becomes infinity. Assuming that $V_B>V_A$, (Tv)b>(Tv)a and if, in this condition, the part y of the program curve is followed, the aperture value becomes greater than the maximum aperture diameter of the lens and therefore, control is necessarily effected by following the part x of the program curve. At this time, the output of the comparator CP1 assumes H-level and $V_C$ is smaller than $V_A$, so that the output of the comparator CP2 assumes L-level. Accordingly, the enabling terminal of the voltage follower F1 is set to L-level by the output of a NOR gate G, the enabling terminal of the voltage follower F2 is set to H-level, and the enabling terminal of the voltage follower F3 is set to L-level. Therefore, the voltage $V_A$ is applied to a meter M through the voltage follower F2.

When $V_A>V_B>V_C$, control follows the part y of the program curve and at this time, the output of the comparator CP1 assumes L-level and the output of the comparator CP2 assumes L-level. Accordingly, the enabling terminal of the voltage follower F1 is set to H-level, that of the voltage follower F2 is set to L-level, and that of the voltage follower F3 is set to L-level. Therefore, the voltage $V_B$ is applied to the meter M through the voltage follower F1.

When $V_A>V_C>V_B$, in the part of the program curve, the aperture is stopped down more than the minimum aperture diameter so that control follows the part z and at this time, the comparator CP1 puts out L-level and the comparator CP2 puts out H-level, and the enabling terminal of the voltage follower F1 assumes L-level, that of the voltage follower F2 assumes L-level and that the voltage follower F3 assumes H-level. Accordingly, the voltage $V_C$ is applied to the meter M through the voltage follower F3.

As can be seen from what has been described above, when exposure control follows the part x of the program diagram, the voltage $V_A$ is applied to the meter M; when the exposure control follows the part y, the voltage $V_B$ is applied to the meter M; and when the exposure control follows the part z, the voltage $V_C$ is applied to the meter; therefore, if the shutter speed scale is opposed to the pointer of the meter as shown in FIG. 5A, a proper Tv value whose control may be always expected can be displayed. This display need not always be effected by the meter but may be effected by a light-emitting diode LED opposed to the shutter speed as shown in FIG. 5B.

Next, when the shutter button is further depressed, the restraint of the previously described levers 12 and 16 is removed and the lens aperture is stopped down by actuation of the lever 14, but before that, the switch S1 is opend to permit the voltage at the junction between the resistors R1 and R2 to be stored in a capacitor C1 and the voltage $V_B$ is fixed. As the aperture is stopped down with time, the quantity of light impinging on the photodiode PD assumes a value of the brightness of the object minus the information on the aperture actually stopped down at each point of time, so that the output voltage $V_A$ of the amplifier OP1 becomes (Bv+Sv−Av) which represents the Tv value suited for the condition of proper exposure corresponding to the from-time-to-time aperture information. The voltage $V_A$ and the stored voltage $V_B$ are compared by the comparator CP1 and, at a point of time whereat $V_A$ and $V_B$ become coincident, the output of the comparator CP1 assumes H-level. Therefore, the current which has so far flowed to the electromagnet Mg1 is cut off and the tip end 30a of the lever 30 comes into the pawl of the ratchet wheel 29 to fix the stop-down lever 14, thus stopping the stop-down operation. Next, when the lever 104 is rotated to open the switch S2, the voltage $V_A$ is stored in a capacitor C2. This stored voltage $V_A$ provides one input of the comparator CP3. When the mirror is moved up and the shutter is released by the lever 108, a trigger switch S4 is opened at a point of time whereat the forward shutter curtain begins to move, thereby starting the operation of a time logarithmic conversion circuit constituted by an amplifier OP4, a constant voltage circuit E3, a capacitor C3, diodes D3 and D4, a resistor R5 and a constant current source CC4. This circuit puts out a voltage correspoinding to the Tv value of the exposure time from a time after the forward shutter curtain begins to move. When this Tv value becomes coincident with the stored voltage $V_A$, the comparator CP3 becomes operative and the electromagnet Mg2 is deenergized and the movement of the rearward shutter curtain is initiated.

Next, when the switch S3 selects the terminal 202, the shutter speed first mode takes place. At this time, an output voltage $V_D$ which gives the Tv value (Tv)m of the shutter speed during the manual setting is produced at a point d by a constant current source CC5 and a resistor R6 variable in response to the shutter speed setting operation from outside. This voltage is applied to the comparators CP1 and CP2. Thus, the voltage $V_D$ and the voltage $V_B$ in the previously described program mode have been substituted for.

When $V_D > V_A > V_C$ in the first stage of depression of the shutter button, the aperture must be controlled to a value greater than the open aperture diameter and necessarily therefore, the shutter speed becomes corrected from the manually set value. At this time, the output of the comparator CP1 assumes H-level and the output of the comparator CP2 assumes L-level, so that the voltage $V_A$ is applied to the meter M through the voltage follower F2. Thus, the meter displays a proper shutter speed when the aperture is the maximum aperture diameter.

Next, when $V_A > V_D > V_C$, the aperture is in a controllable range and therefore, the shutter speed is controlled to the manually set value. At this time, the outputs of the comparators CP1 and CP2 assume L-level, respectively, and the voltage $V_B$ is applied to the meter M through the voltage follower F1. Thus, the meter displays the manually set shutter speed.

When $V_A > V_C > V_D$, the aperture can be stopped down only to the minimum aperture diameter and necessarily therefore, the shutter speed is corrected from the manually set value. In this case, the output of the comparator CP1 assumes L-level and the output of the comparator CP2 assumes H-level, so that the voltage $V_C$ is applied to the meter M through the voltage follower F3. Thus, the meter displays the proper shutter speed when the aperture is the minimum aperture diameter.

Thereafter, if the shutter button is further depressed, the exposure time is controlled in the manner described above.

From what has been described above, it is seen that even in the shutter speed first mode, the shutter speed actually controlled is displayed by the meter M depending on the condition of the aperture.

Next, when the switch S3 selects the terminal 203, the aperture first mode takes place. Thereupon, the non-inversion input terminal of the comparator CP1 and the inversion input terminal of the comparator CP2 are forcibly wrought to the ground level. Since the resistor R4 introduces the information on the preset aperture value ((Av) preset−AvO) manually set, the value of the voltage $V_C$ becomes Bv+Sv−(Av) preset and thus, represents a Tv value suited for proper exposure for the set aperture value. On the other hand, the noninversion input terminal of the comparator CP1 and the inversion input terminal of the comparator CP2 assume a voltage level smaller than the voltage $V_C$ as mentioned above, the voltage $V_C$ is applied to the meter M by the operation as described previously. During control, the output of the comparator CP1 always remains at L-level, so that the aperture is not restrained until it reaches a value set by the preset ring of the lens. At a point of time whereat the aperture reaches the set value, the shutter is controlled by the voltage $V_A$ as mentioned previously.

In response to change-over of the switch S3, it is also possible to display each mode by means of a light-emitting element or the like.

In the embodiment as described above, if the aperture ring is set to a value other than the minimum aperture diameter in a wrong program mode or a shutter first mode, the set aperture diameter cannot be controlled. Then, control is effected as if the aperture value set by the aperture ring were the minimum aperture diameter, but again in that case, it is possible to display the properly controlled shutter speed by introducing the set aperture diameter into the circuit by means of the resistor R4.

Also, the voltage followers F1, F2 and F3 act as analog switches and it is therefore apparent that these may be replaced by transistors or FET's.

We claim:

1. An automatic exposure control device of a single lens reflex camera having an objective lens and an aperture comprising:
  (a) a first means for calculating and generating a first signal in accordance with the brightness of the object light passed through said aperture;
  (b) a second means for calculating and generating a second signal determined in accordance with a predetermined program and said first signal;
  (c) means for driving said aperture to vary a diameter thereof in response to the shutter release operation;
  (d) means for holding said second signal immediately before driving the aperture by said driving means;
  (e) means for comparing said first signal and said second signal held by said holding means;
  (f) means for latching said driving means in response to the output from said comparing means; and
  (g) means for controlling a shutter speed in accordance with the brightness of the object light passed through the aperture after said driving means has been latched by said latching means.

2. A device according to claim 1, wherein
said first signal corresponds to the shutter speed providing a proper exposure for the object light passed through said aperture; and
said second signal corresponds to a shutter speed determined by said program.

3. A device according to claim 2, wherein
said control means includes means for memorizing said first signal generated after said driving means has been latched by said latching means whereby said control means controls the shutter speed in response to the output from said memory means.

4. In an exposure control apparatus for a camera having interchangeable lens, which measures light passed through a photographing lens and controls shutter speed and aperture in accordance with a programmed relation $TV = \alpha AV + \gamma$, where $\alpha$ and $\gamma$ are constants, in response to the intensity of the light, and which comprises means for producing a first electric signal corresponding to an APEX notation BV+Sv−Avo where Avo is the Av value of the maximum aperture, by metering light passed through the maximum aperture of said lens, and means for producing a second electric signal corresponding to the value Avo by detecting the maximum aperture of said lens, the improvement which comprises:
  (a) means ($R_1$, $R_2$, $OP_2$) for producing a third electric signal corresponding to an APEX notation $Tv = (\alpha)/(1+\alpha)(Bv+Sv) + (\gamma)/(1+\alpha)$ by combining the first and second electric signals to cancel the value Avo;
  (b) means ($CP_1$, $Mg_1$) for controlling said aperture to stop down the same by an amount Av corresponding to the difference between the third and first electric signals;

(c) means (PD, $E_2$, $OP_1$) for producing a fourth electric signal corresponding to an APEX notation $Bv+Sv-Av$ when said aperture has been stopped down by said aperture controlling means; and (d) means for controlling said shutter speed in accordance with said fourth electric signal.

5. An exposure control apparatus as claimed in claim 4, wherein said third electric signal producing means includes means ($S_1$, $C_1$) for holding said third electric signal before stopping down said aperture by said aperture control means.

6. An exposure control apparatus as claimed in claim 4, wherein said aperture control means includes means for comparing said third electric signal with said fourth electric signal and stopping the stopping-down operation of said aperture when the fourth electric signal is coincident with the third electric signal.

7. An exposure control apparatus as claimed in claim 4, wherein said third electric signal producing means includes (a) compressing means connected to said first electric signal producing means and producing an output signal corresponding to the product of said first electric control signal and $(\alpha)/(1+\alpha)$; and (b) means for adding to the output signal of the compressing means a signal corresponding to $(1)/(1+\alpha)(\alpha Avo+\gamma)$.

8. In an exposure control apparatus for a camera having interchangeable lens, which measures light passed through a photographing lens and controls shutter speed and aperture in accordance with a programmed relation $TV=\alpha AV+\gamma$, where $\alpha$ and $\gamma$ are constants, in response to the intensity of the light, and which comprises means for producing a first electric signal corresponding to an APEX notation $BV+Sv-Avo$ where Avo is the AV value of the maximum aperture, by metering light passed through the maximum aperture of said lens, and means for producing a second electric signal corresponding to the value Avo, the improvement which comprises:

(a) means for producing a third electric signal corresponding to an APEX notation $Tv=(\alpha)/(1+\alpha)(Bv+Sv)+(\gamma)/(1+\alpha)$ by combining the first and second electric signals to cancel the value Avo;

(b) means for controlling said aperture to stop down the same by an amount Av corresponding to the difference between the third and first electric signals;

(c) means for producing a fourth electric signal corresponding to an APEX notation $Bv+Sv-Av$ when said aperture has been stopped down by said aperture controlling means; and (d) means for controlling said shutter speed in accordance with said fourth electric signal.

9. An exposure control apparatus for a camera having interchangeable lens, which measures light passed through a photographing lens and controls shutter speed and aperture so that both the shutter speed and aperture controlled in response to variation in the brightness of the object to be photographed, may be varied in accordance with a predetermined relation, comprising:

(a) means for producing metering output corresponding to the intensity of light passed through said aperture;

(b) means for producing a first electric signal based on the metering output produced when said aperture is maximum, the first electric signal corresponding to a shutter speed for a proper exposure related to the maximum aperture;

(c) means for producing a second electric signal related to the maximum aperture;

(d) means for producing a third electric signal corresponding to a shutter speed in said predetermined relation, based on the metering output produced at the maximum aperture and said second electric signal, the third electric signal producing means including means for combining said metering output and said second electric signal to cancel the maximum aperture value;

(e) means for controlling said aperture in order to stop down the aperture so that the aperture may be varied in correspondence with difference between said third and first electric signals;

(f) means for producing a fourth electric signal based on the metering output produced when the aperture has been stopped down by the aperture control means; and (g) means for controlling the shutter speed in accordance with said fourth electric signal.

10. An exposure control apparatus for a camera having interchangeable lens, which measures light passed through a photographing lens and controls shutter speed and aperture so that both the shutter speed and aperture controlled in response to variation in the brightness of the object to be photographed, may be varied in accordance with a predetermined relation, comprising:

(a) means for producing metering output corresponding to the intensity of light passed through said aperture;

(b) means for producing a first electric signal based on the metering output produced when said aperture is maximum, the first electric signal corresponding to a shutter speed for a proper exposure related to the maximum aperture;

(c) means for producing a second electric signal related to the maximum aperture;

(d) means for producing a third electric signal corresponding to a shutter speed in said predetermined relation, based on said first and said second electric signals, the third electric signal producing means including means for combining said first and said second electric signals to cancel the maximum aperture value;

(e) means for controlling said aperture in order to stop down the aperture so that the aperture may be varied in correspondence with difference between said third and first electric signals;

(f) means for producing a fourth electric signal based on the metering output produced when the aperture has been stopped down by the aperture control means; and (g) means for controlling the shutter speed in accordance with said fourth electric signal.

* * * * *